INVENTORS.
IRA. J. RADOVSKY &
VICTOR KOPPEL.
BY
ATTORNEY.

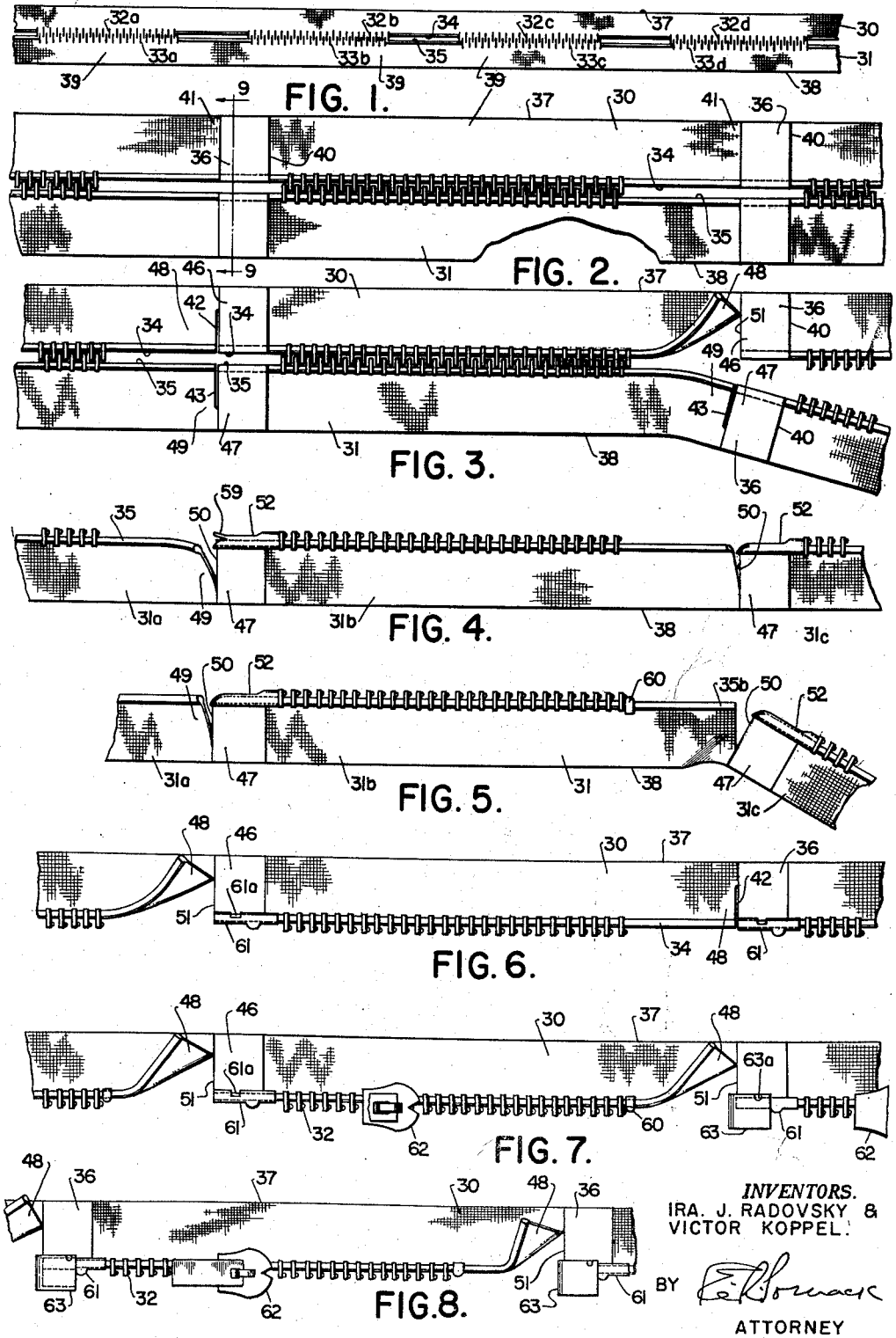

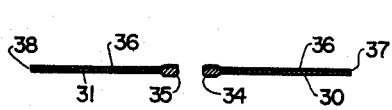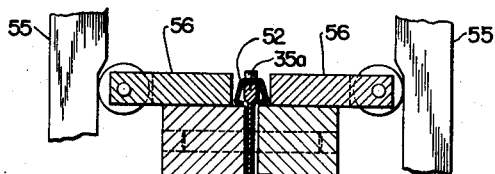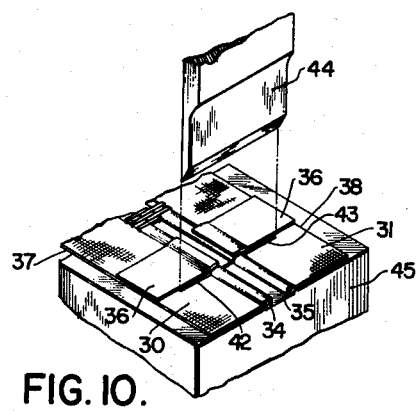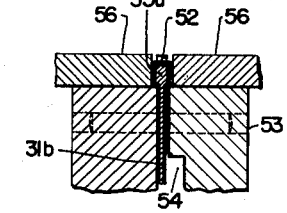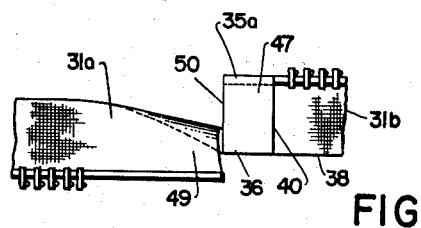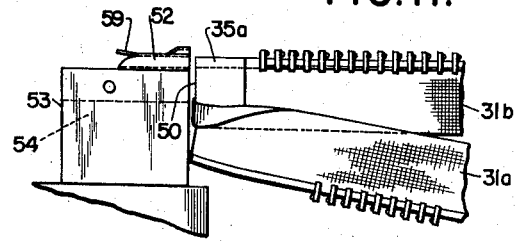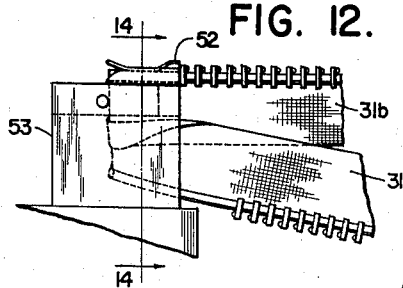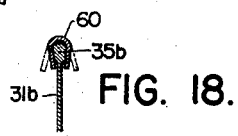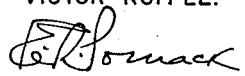
INVENTORS
IRA J. RADOVSKY &
VICTOR KOPPEL.
ATTORNEY

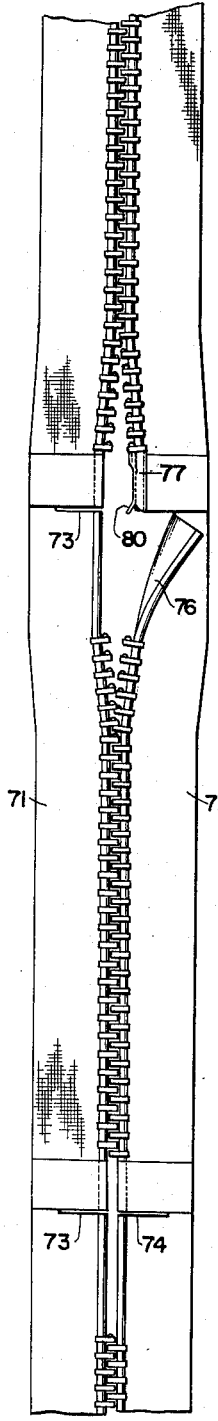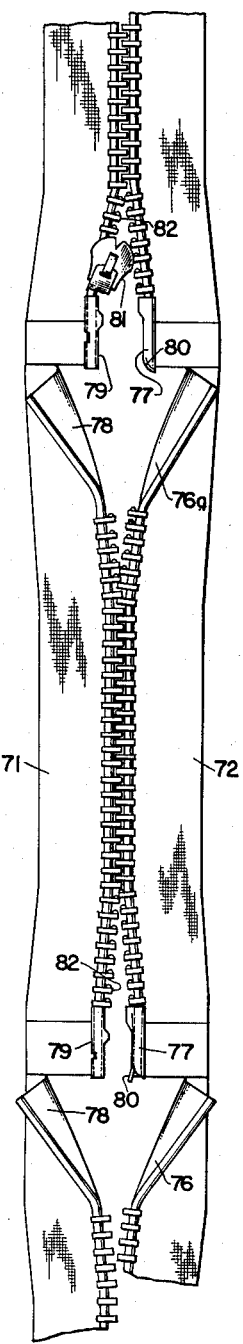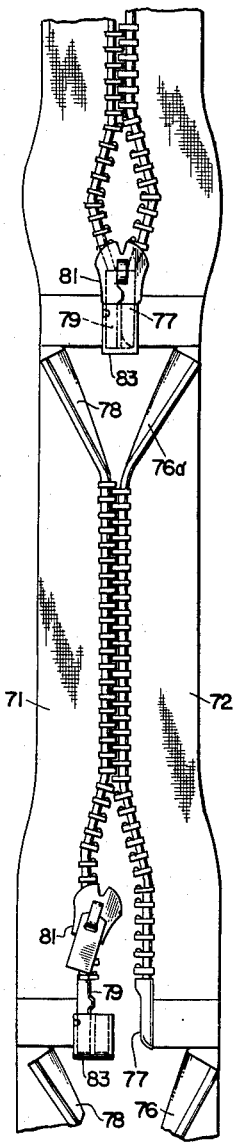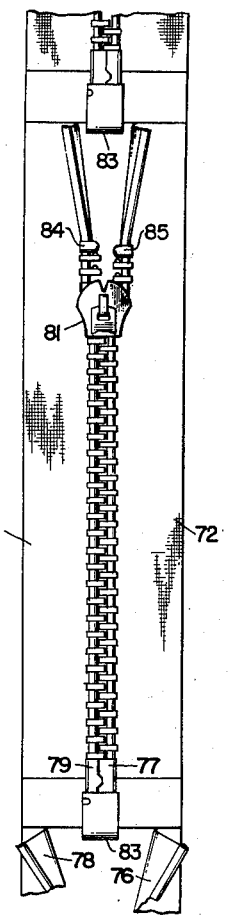

United States Patent Office 3,081,462
Patented Mar. 19, 1963

3,081,462
SLIDE FASTENER TAPES AND THE METHOD OF MAKING SAME
Ira J. Radovsky, Albertson, and Victor Koppel, Manhattan, N.Y., assignors to New York Notion Co., Inc., New York, N.Y., a corporation of New York
Filed June 30, 1960, Ser. No. 39,992
11 Claims. (Cl. 2—265)

This invention relates to slide fastener tapes and their manufacture, and is particularly directed to the category of such devices in which the two coacting tape members are completely separable.

Separable tape assemblies of the above-referred to category comprise two tape sections with marginal coacting fastener elements, one of said sections having at the lowermost portion thereof a bottom terminal member serving as a stop for the slide member, and also as a socket to fixedly receive a pin secured to the tape section to which said terminal member is attached and to slidably receive another pin attached to the lowermost portion of the other tape section—both of said pins being adapted to slidably receive thereover said slide member; and each of said tape sections having at the top of its row of fastener elements an upper stop member. In the conventional method of fabricating such tape assemblies it is necessary to cut them into predetermined lengths so as to make it possible to attach said pins at the extreme bottom portions of the two tapes, to anchor the said terminal member at the extreme bottom of one of said tapes, and attach said upper stop members to the respective tapes above their topmost fastener elements. Tape assemblies produced by said conventional method are thus necessarily separate units of the relatively short lengths required for final use in the garment, thereby requiring separate handling and time-consuming sorting and packaging. Moreover, in the manufactures of garments embodying said tape assemblies, sewing machine operators are required to separately select and handle each individual assembly, resulting in a relatively slow and thus correspondingly costly procedure.

It is an object of our invention to eliminate the aforesaid disadvantages in the manufacture and use of separable slide fastener tape assemblies by a novel method of fabrication which enables said pins, terminal members and stop members to be operatively attached to the coacting tapes without cutting them into separate short-length units. And in this aspect of our invention it is our objective to apply our novel method to the extended lengths of tape as supplied by the manufacturer thereof in rolls or otherwise, such tapes having a plurality of longitudinally aligned sections of attached fastener elements, the steps of our method being accomplished without affecting the continuity of said extended lengths.

It is a further object of our invention to enable our method to be operatively applied either to separated element-containing tapes, or to assemblies of two operatively attached complementary tapes.

Another object of this invention is to provide continuous lengths of completed tapes—either assembled or separated, in rolls or in containers—ready for continuous use by operators of sewing machines or other tape-securing means, whereby the tape can be continuously moved along the operator's table to permit sequential attaching operations upon garments, the tape sections to be severed thereafter.

And it is our objective to enable the steps of our method to be economically performed, and to provide relatively inexpensive fully completed fastener tapes of the class above mentioned.

Other objects, features and advantages will appear from the drawings and the description hereinafter given.

Referring to the drawings,

FIG. 1 is a fragmentary plan view of an assembly of a pair of separable complementary slide fastener stringers usable in the process of our invention and shown prior to the operative attachment of top and bottom stop and terminal members.

FIG. 2 is an enlarged fragmentary plan view of a portion of the assembly of FIG. 1, the stringers being shown with reenforcing strips attached.

FIG. 3 is a view like FIG. 2 after the slitting step of our invention, the two complementary stringers being shown in the process of being separated.

FIG. 4 is a fragmentary plan view of one of the two complementary tape stringers after the performance of the successive steps of attaching to the bottom of one fastener section a slide terminal pin and closing the tip of the pin on the next adjacent fastener section.

FIG. 5 is a fragmentary plan view of the stringer of FIG. 4 after the performance of the final step of attaching the upper stop member in place.

FIG. 6 is a fragmentary plan view of the other of the two complementary stringers after the performance of the step of attaching fixed terminal pins to two successive fastener sections.

FIG. 7 is a view substantially like FIG. 6 but showing the stringer after a slide member has been slidably positioned over the row of fastener elements on one section, the upper stop member affixed, and the socket-stop member operatively affixed to the bottom of the next adjacent section.

FIG. 8 is a view like FIG. 7 but showing a continuation thereof, one section being shown in its completed form.

FIG. 9 is a section of FIG. 2 taken along line 9—9.

FIG. 10 is a fragmentary semi-schematic perspective view of the tape section of FIG. 3 on a die block, and the cutting die in raised position after the performance of the slitting operation according to our invention.

FIG. 11 is a fragmentary elevational view of two adjacent sections of the stringer of FIG. 13 showing a bent-back postion of the top flap of one section to render the bottom flap of the next adjacent section accessible for attaching thereto a terminal pin such as the attached pin shown in FIG. 4.

FIG. 12 is a fragmentary elevational view of two adjacent sections like those of FIG. 11, but showing a fully twisted postion of one of the sections, the bottom flap of the adjacent section being shown adjacent a die block operatively supporting said pin.

FIG. 13 is a view substantially like FIG. 12, but showing said bottom flap operatively disposed within the die block with the inner edge of the flap positioned within the open pin in preparation for the attaching operation.

FIG. 14 is a section of FIG. 13 taken along line 14—14 prior to the attaching operation.

FIG. 15 is a fragmentary view of FIG. 13 showing the pin operatively clamped to the said bottom flap by the two opposing die members.

FIG. 16 is a fragmentary elevational view of the two adjacent sections after the step illustrated in FIG. 15, the said bottom flap being operatively disposed in a die block substantially like that shown in FIG. 12, the die being shown operatively bending down the bottom prong of the said pin.

FIG. 17 is a fragmentary elevational view of the opposite end of one of said sections to which a terminal pin has been attached, one section being shown folded and twisted back to permit the attachment of the upper stop member illustrated in FIG. 5.

FIG. 18 is a fragmentary section of FIG. 17 taken along line 18—18, showing by dot-dash lines the stop member before being attached in place, and by full lines after being attached.

FIG. 26 is a fragmentary plan view of an assembly of complementary stringers in the process of being worked according to another form of our invention, the stringers being shown operatively slit and a slide pin operatively attached to one of the stringers.

FIG. 27 is a fragmentary plan view of the stringers of FIG. 26 after two further successive steps showing a fixed pin operatively attached to the other of the stringers after the completion of one of said steps, and a slide member applied to said last mentioned stringer after the completion of the other of said steps.

FIG. 28 is a fragmentary plan view of the stringer of FIG. 27 after the successive steps of attaching the socket-stop member to one of said stringers and inserting the slide pin of the other stringer into the socket.

FIG. 29 is a fragmentary plan view of the stringer of FIG. 28 after the attachment of the upper stop member, showing a completed section.

Figure 19:
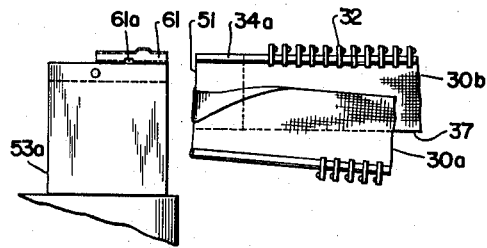
FIG. 19 is an elevational view of two adjacent sections of the stringer of FIG. 6 showing one of the fastener sections twisted and folded back, the bottom flap of the adjacent section being shown adjacent a die block supporting a terminal pin, substantially in the manner shown in FIG. 12.

In accordance with conventional practice, extended lengths of interengaged slide fastener tape stringers, each with a plurality of spaced fastener sections, are provided—generally in rolls—to the operators whose job it is to attach top and bottom terminal members and to mount slide members on each of said sections in preparation for the operations of securing said sections as separate units to garments. A fragment of two such interengaged stringers is illustrated in FIG. 1 in which the complementary tape stringers 30 and 31 have spaced coacting rows of fastener elements thereon, the rows of elements 32a, 32b, 32c and 32d of stringer 30 being interengaged with corresponding spaced rows of elements 33a, 33b, 33c and 33d of stringer 31—said fastener elements being anchored, in known manner, to the respective inner lateral beaded edges 34 and 35 of said stringers. It is evident that the opposing portions of the edges 34 and 35 between the respective rows of fastener elements are disengaged and in laterally spaced relation. It is customary, in accordance with conventional practice, to apply reinforcing strips of material, generally designated 36, to the tape stringers in the regions thereof between the rows of the fastener elements, said strips extending transversely between the outer edges 37 and 38 of said respective stringers and their said respective inner edges 34 and 35, the longitudinal distance between corresponding transverse edges of said strips defining the length of the fastener sections which are later to be severed from the stringer for forming separate tape units.

For the purpose of this specification the said sections, generally designated 39, are shown as extending between the corresponding edges 40 of successive strips 36 (FIG. 2)—each of said strips being deemed herein to be positioned at the bottom of each section, the opposite portion of each section, generally designated 41, being herein regarded as the top of the section.

In the preferred method of practicing our invention, the interengaged stringers 30 and 31 are first slit transversely adjacent said edges 40 of said reinforcing strips 36, the slits extending partially outwardly from the respective inner lateral edges of the respective stringers. In the embodiment illustrated, the slits—generally designated 42 for the stringer 30, and 43 for the stringer 31—extend from the respective inner edges 34 and 35 to points short of the respective outer lateral edges 37 and 38 of the said stringers—said slits being disposed at the lowermost edge of said respective sections 39. Said slits may be formed by any known cutting method, such as by the blade 44 (FIG. 10) coacting with the die block 45 upon which the complementary stringers 30 and 31 have been positioned, the blade having formed the slits 42 and 43 in a manner known to those skilled in the art.

The formation of said slits is one of the critical aspects of this invention, for their formation results in the creation of bottom flaps generally designated 46 and 47 on each of said sections, and top flaps generally designated 48 and 49 on each of the next adjacent sections. The said slits thus result in the formation of free bottom edges 50 and 51 which enable conventional terminal slide fastener members to be applied without completely severing all the sections from the stringers. The movement of one or both of the top and bottom flaps flanking each slit out of the plane of the stringer tape will make the edge to which the terminal member is to be attached accessible to the attaching mechanism. For example, the top flap 49 (FIG. 4) can be slightly deflected, whereupon the slide pin 52 can be readily attached to flap 47; or said top flap can be folded back to the position shown in FIG. 11, whereby the bottom edge 50 of the flap 47 is completely unobstructed.

In the particular method illustrated, after the formation of said slits, the two stringers 30 and 31 are separated, as indicated in FIG. 3, whereupon each stringer can be separately subjected to the steps of our method. In the embodiment shown, it is intended that the stringers be manually fed to attaching apparatus; and to effectuate this method of practicing our invention the top flap 49 of section 31a is first folded down substantially to the position shown in FIG. 11, and then the entire section 31a is twisted back into adjacent lateral relation to the section 31b (FIG. 12), thereby providing a clear front portion of stringer for operative placement within the die block 53 operatively supporting the open slide terminal pin 52. The twisted tape is inserted within the space 54 in the die block 53 with the lower beaded free edge 35a operatively disposed within the said open pin 52. The cam members 55 are then operatively depressed to force the two coacting die members 56 inwardly, thereby clamping the pin 52 on to said beaded free edge 35a (see FIGS. 13 and 15). Thereafter, using a die block 57 substantially like said block 54 but with a vertically movable die member 58, and inserting the twisted stringer sections into said block 57 in the manner aforesaid, the prong 59 of pin 52 is closed by forcing it down from the dot-dash position of FIG. 16 over the juncture of said free edge 35a and bottom edge 50, in known manner. The above-mentioned steps illustrated in FIGS. 11 to 15 fasten the pin 52 in place as indicated at the left side of FIG. 4, and the step illustrated in FIG. 16 finishes said pin in the form shown at the right side of FIG. 4.

The upper stop member 60 (FIG. 5) is then operatively attached to the upper portion of the beaded edge 35 by any suitable clamping means known in those skilled in the art, such as like that illustrated in FIG. 14. In applying the stringer to the attaching die, the section 31c is folded and twisted back, substantially in the manner aforesaid, so as to leave the inner beaded edge portion 35b free to permit the open stop member 60 to be operatively slid therealong into its operative position (FIG. 17), and then clamped from the dot-dash open position of FIG. 18 to the illustrated closed full line position. After all sections are similarly processed, the stringer 31 is placed on a roll, or otherwise packed, ready for operative attachment to garments in a manner to be hereinbelow described.

Figure 20:
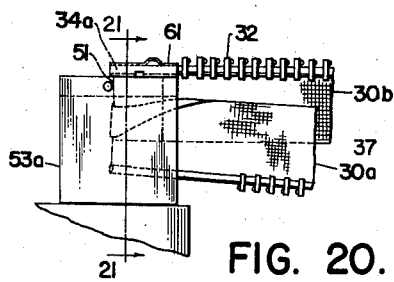
FIG. 20 is an elevational view showing the bottom flap operatively disposed within the die block with the inner edge of the flap positioned within the open pin in preparation for the attaching operation.
Figure 23:
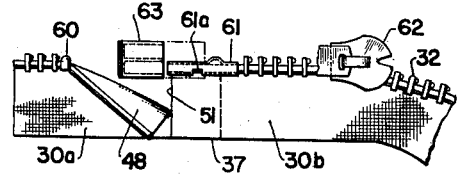
FIG. 23 is an elevational view of the stringer portion of FIG. 20 after the completion of the operation indicated by FIG. 22, but with the slide member in place, and showing in full lines the socket-stop member before operative attachment to the previously anchored slide pin, and in dot-dash lines the final position of said socket-stop member.
Figure 24:
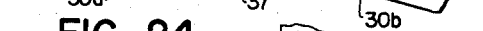
FIG. 24 is a view like FIG. 23, but showing the socket-stop member affixed in position.
Figure 22:
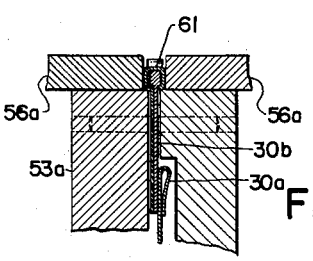
FIG. 22 is a fragmentary view of FIG. 21 showing the pin operatively clamped to the bottom flap by the two opposing die members.
Figure 21:
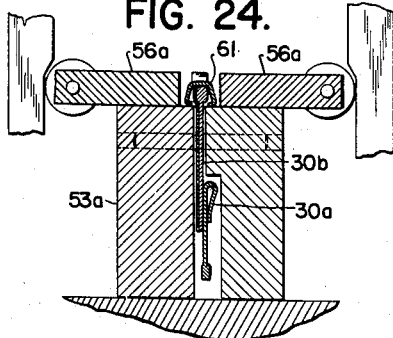
FIG. 21 is a section of FIG. 20 taken along line 21—21, prior to the attaching operation.

The stringer 30 is then processed by first applying the fixed terminal pin 61 substantially in the manner above described with reference to pin 52. By referring to FIGS. 19 and 20, it will be seen that the section 30a is folded and twisted back, so as to permit the string in this condition to be operatively inserted in die block 53a supporting the open pin 61, the inward operative movement of the die members 56a (FIGS. 21 and 22) clamping the pin 61 upon the lower portion of the inner beaded edge 34 of said section. Then the slide member 62 is slid over the pin 61 and therebeyond, and positioned upon the row of fastener elements 32. Thereafter the socket-stop member 63 is fixedly secured to the said pin 61, this being accomplished, in the particular manner illustrated (FIGS. 23 and 24), by folding back the flap 48 of section 30a to provide the free edge 51, whereafter the said member 63 is slid onto the body of pin 61 and locked into place by pressing the wall portion 63a of member 63 into the recessed portion 61a of pin 61. The die mechanism for effecting each attachment is not herein shown, since it is known to those skilled in the art and further because a detailed description thereof is not necessary for an understanding of this invention. An upper stop member (not shown), like member 60 above described, can then be operatively applied to section 30b to complete the processing of the section; and after all sections are similarly processed, stringer 30 is ready to be applied to garments.

Figure 25:
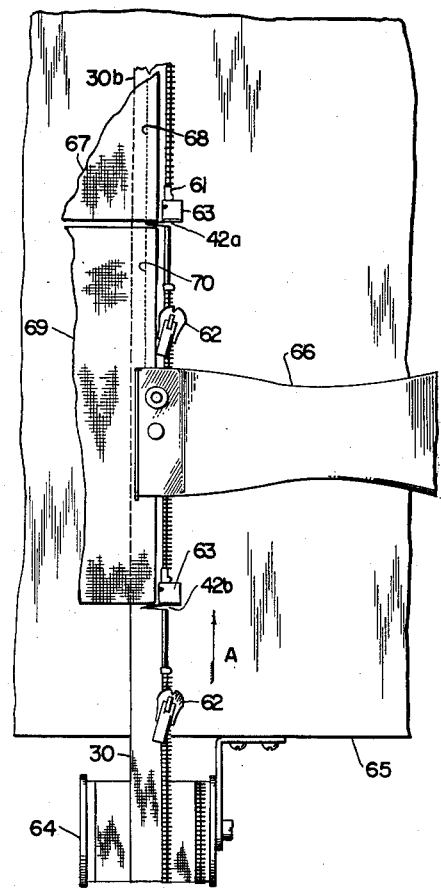
FIG. 25 is a semi-schematic plan view of a completed tape stringer being fed from a roll onto a sewing machine table with sections of said stringer successively being sewn to garments.

FIG. 25 schematically illustrates the manner of operaively employing the above-described completed stringers in a sewing operation. The stringer 30, rolled upon reel 64, is moved along the sewing table 65 in the direction of the arrow A, and garments are successively placed thereover in the sewing line of the machine 66 and sewn to successive sections of the stringer. Garment 67 is shown with section 30b of the stringer attached by the previously formed stitching 68; and garment 69 is being shown in the process of being sewn, along stitching line 70, by the machine 66. There is thus a continuous uninterrupted sewing process without the necessity of separately handling individual tape units or sections. After the sewing operation, the stringer 30 can readily be severed, by any known method, along the successive slits 42a, 42b, etc.

FIGS. 26 to 29 illustrate another method of our invention in which the terminal members are operatively attached without the need to separate the two coacting stringers as in the method first above described. The assembled stringers 71 and 72, supplied in the form shown in FIG. 1, are first subjected to the slitting operations above described, to form slits 73 and 74 in the respective stringers. The flap 76 is then folded back and the slide terminal pin 77 operatively fastened in place in the manner aforesaid, in the position illustrated in FIG. 26. The flap 78 (bottom of FIG. 27) is now folded back and the fixed terminal pin 79 operatively applied, the next step being the bending down of the prong 80 in place (top of FIG. 27), this being successively done to all pins 77, the flaps 76a being folded back to permit such operation. Flaps 78 are then folded back and for each section the slide member 81 slide over the corresponding pin 79 and the beaded inner edge 82, as shown at the top of FIG. 27. The socket-stop 83 is then operatively applied to each pin 79, as shown at the bottom of FIG. 28, the top of said figure showing the next steps of inserting the slide pin 77 in socket member 83 and moving the slide member 81 down into operative engagement with the said socket-stop member 83. FIG. 29 shows the upper stop members 84 and 85 in place, attached in the manner aforesaid, the slide member 81 being shown at the top of the two coacting interengaged rows of fastener elements. The assembled lengths of complementary stringers are now ready to be rolled on to a reel for subsequent sewing and severing operations.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. In a slide fastener tape stringer for subsequent division into a plurality of separate tape units and wherein each unit is adapted for operative use with one of a plurality of slide members, the combination of a plurality of longitudinally aligned spaced fastener sections, each section having a row of marginal fastener elements attached to the inner lateral edge thereof and adapted for coactive use with one of said slide members, said tape stringer having a plurality of transverse slit portions in spaced relation to the bottoms of said respective rows of fastener elements, said slit portions extending partially outwardly from said inner lateral edge of the tape stringer whereby a plurality of adjacent top and bottom flaps are formed at the respective uppermost and lowermost portions of said respective sections, and a bottom terminal member fixedly attached to each of said bottom flaps and adapted for operative engagement with one of said slide members.

2. In a slide fastener tape stringer for subsequent division into a plurality of separate tape units and wherein each unit is adapted for operative use with one of a plurality of slide members, the combination of a plurality of longitudinally aligned spaced fastener sections, each section having a row of marginal fastener elements attached to the inner lateral edge thereof and adapted for coactive use with one of said slide members, said tape stringer having a plurality of transverse slit portions in spaced relation to the bottoms of said respective rows of fastener elements, said slit portions extending partially outwardly from said inner lateral edge of the tape stringer whereby a plurality of adjacent top and bottom flaps are formed at the respective uppermost and lowermost portions of said respective sections, each of said bottom flaps having a bottom edge and an inner side edge below the bottom of the row of fastener elements on the corresponding section, and a bottom terminal member fixedly attached to each of said bottom flaps at said inner side edge and extending downwardly to the region of siad bottom edge, each of said terminal members being adapted for operative engagement with one of said slide members.

3. In a slide fastener tape stringer for subsequent division into a plurality of separate tape units and wherein each unit is adapted for operative use with one of a plurality of slide members, the combination of a plurality of longitudinally aligned spaced fastener sections, each section having a row of marginal fastener elements attached to the inner lateral edge thereof and adapted for coactive use with one of said slide members, said tape stringer having a plurality of transverse reinforcing strips below said respective rows of fastener elements and slit portions adjacent the bottom edges of said respective strips, said slit portions extending partially outwardly from said inner lateral edge of the tape stringer whereby a plurality of adjacent top and bottom flaps are formed at the respective uppermost and lowermost portions of said respective sections, and a bottom terminal member fixedly attached to each of said bottom flaps and adapted for operative engagement with one of said slide members.

4. In an assembly of a pair of separable complementary slide fastener tape stringers for subsequent division into a plurality of separate pairs of tape units and wherein each pair of units is adapted for operative use with one of a plurality of slide members, the combination of a plurality of laterally opposite, longitudinally aligned spaced fastener sections on said respective tape stringers, each of said sections having a row of marginal fastener elements attached to the inner lateral edge thereof and operatively engageable with the corresponding laterally opposite row of fastener elements on the complementary tape stringer, said rows of elements being adapted for coactive engagement with one of said slide members, said complementary tape stringers having at laterally opposite portions thereof a plurality of transverse slit portions in spaced relation to the bottoms of said respective rows of fastener elements, said slit portions extending partially outwardly from said inner lateral edges of the said respective tape stringers, whereby a plurality of adjacent top and bottom flaps are formed at the respective uppermost and lowermost portions of said respective sections, and a bottom terminal member fixedly attached to each of said bottom flaps and adapted for operative engagement with one of said slide members.

5. In a method of making separable slide fastener tape units, the steps of providing a length of tape stringer having a plurality of longitudinally aligned spaced fastener sections each with a row of marginal fastener elements attached to the inner lateral edge thereof and adapted for coactive use with a suitable slide member, forming transverse slits in said stringer at said respective fastener sections in spaced relation to the bottoms of said respective rows of fastener elements, said slits extending partially outwardly from said inner lateral edge of said stringer, thereby forming a plurality of top and bottom flaps at the respective uppermost and lowermost portions of said respective sections whereby each bottom flap presents a free bottom edge, providing a plurality of bottom terminal members each adapted for operative engagement with one of said slide members each adapted for operative engagement with one of said slide members, and attaching to each of said bototm flaps adjacent said bottom edge thereof one of said terminal members.

6. In a method of making separable slide fastener tape units, the steps of providing a length of tape stringer having a plurality of longitudinally aligned spaced fastener sections each with a row of marginal fastener elements attached to the inner lateral edge thereof and adapted for coactive use with a suitable slide member, cutting a plurality of slits in said stringer transversely from the inner lateral edge thereof partially across said stringer at said respective fastener sections and in spaced relation to the bottoms of said respective rows of fastener elements, thereby forming a plurality of top and bottom flaps at the respective uppermost and lowermost portions of said respective sections whereby each bottom flap presents a free bottom edge, providing a plurality of bottom terminal members each adapted for operative engagement with one of said slide members, and attaching to the inner edge of each of said bottom flaps and adjacent said bottom edge thereof one of said terminal members.

7. In a method of making separable slide fastener tape units, the steps of providing a length of tape stringer having a plurality of longitudinally aligned spaced fastener sections each with a row of marginal fastener elements attached to the inner lateral edge thereof and adapted for coactive use with a suitable slide member, forming transverse slits in said stringer at said respective sections in spaced relation to the bottoms of said respective rows of fastener elements, said slits extending partially outwardly from said inner lateral edge of said stringer, thereby forming a plurality of top and bottom flaps at the respective uppermost and lowermost portions of said respective sections, whereby each slit is flanked by adjacent top and bottom flaps, providing a plurality of bottom terminal members each adapted for operative engagement with one of said slide members, moving one of said flaps at each of said slits out of the plane of said stringer, and attaching to each of said bottom flaps one of said terminal members.

8. In a method of making separable slide fastener tape units, the steps of providing a length of tape stringer having a plurality of longitudinally aligned spaced fastener sections each with a row of marginal fastener elements attached to the inner lateral edge thereof and adapted for coactive use with a suitable slide member, forming transverse slits in said stringer at said respective fastener sections in spaced relation to the bottoms of said respective rows of fastener elements, said slits extending partially outwardly from said inner lateral edge of said stringer, thereby forming a plurality of top and bottom flaps at the respective uppermost and lowermost portions of said respective sections, providing a plurality of bottom terminal members each adapted for operative engagement with one of said slide members, successively folding back each section from the bottom slit thereof to present an unobstructed bottom flap, and attaching to each of said bottom flaps one of said terminal members.

9. In a method of making separable slide fastener tape units, the steps of providing a length of tape stringer having a plurality of longitudinally aligned spaced fastener sections each with a row of marginal fastener elements attached to the inner lateral edge thereof and adapted for coactive use with a suitable slide member, forming transverse slits in said stringer at said respective fastener sections in spaced relation to the bottoms of said respective rows of fastener elements, said slits extending partially outwardly from said inner lateral edge of said stringer, thereby forming a plurality of top and bottom flaps at the respective uppermost and lowermost portions of said respective sections, whereby each slit is flanked by adjacent top and bottom flaps, providing a plurality of bottom terminal members each adapted for operative engagement with one of said slide members, successively folding the top flap of each of said sections out of the plane of the stringer and twisting back each of said sections into lateral relation with the adjacent section thereby to present a free bottom flap of said adjacent section, and attaching to each of said bottom flaps one of said terminal members.

10. In a method of making separable slide fastener tape units, the steps of providing an assembly of a pair of complementary tape stringers having a plurality of laterally opposite longitudinally aligned spaced fastener sections with a corresponding plurality of interengaged portions having interengaged rows of marginal fastener elements attached to the respective inner lateral edges of said sections, forming transverse slits in said respective stringers at each of said fastener sections in spaced relation to the bottoms of said respective rows of fastener elements, said slits extending partially outwardly from said inner lateral edges of said respective stringers, thereby forming a plurality of top and bottom flaps at the respective uppermost and lowermost portions of said respective sections, providing complementary bottom terminal members for each of the operatively interengaged sections, and while said sections are operatively interengaged attaching to each of the bottom flaps of each of said sections one of said terminal members.

11. In a method of making separable slide fastener tape units and attaching them to a plurality of garments, the steps of providing a length of tape stringer having a plurality of longitudinally aligned spaced fastener sections each with a row of marginal fastener elements attached to the inner lateral edge thereof and adapted for coactive use with a suitable slide member, forming transverse slits in said stringer at said respective fastener sections in spaced relation to the bottoms of said respective rows of fastener elements, said slits extending partially outwardly from said inner lateral edge of said stringer, thereby forming a plurality of top and bottom flaps at the respective uppermost and lowermost portions of said respective sections, whereby each slit is flanked by adjacent top and bottom flaps, providing a plurality of bottom terminal members each adapted for operative engagement with one of said slide members, moving one of said flaps at each of said slits out of the plane of said stringer, attaching to each of said bottom flaps one of said terminal members, and successively sewing each of said sections to said respective garments.

References Cited in the file of this patent

UNITED STATES PATENTS

| | | |
|---|---|---|
| 2,219,165 | Nedal | Oct. 22, 1940 |
| 2,283,642 | Murray | May 19, 1942 |
| 2,325,305 | Carlile | July 27, 1943 |
| 2,582,456 | Poux | Jan. 15, 1952 |
| 2,623,214 | Yaffe | Dec. 30, 1952 |
| 2,731,643 | Waldes | Jan. 24, 1956 |
| 2,828,523 | Morin | Apr. 1, 1958 |